(12) United States Patent
Swan

(10) Patent No.: US 9,963,080 B2
(45) Date of Patent: May 8, 2018

(54) TOW BALL COUPLING AND HOLDER MEMBER

(71) Applicant: Roy William Swan, Berriedale (AU)

(72) Inventor: Roy William Swan, Berriedale (AU)

( * ) Notice: Subject to any disclaimer, the term of this patent is extended or adjusted under 35 U.S.C. 154(b) by 0 days. days.

(21) Appl. No.: 15/213,438

(22) Filed: Jul. 19, 2016

(65) Prior Publication Data

US 2017/0028799 A1    Feb. 2, 2017

(30) Foreign Application Priority Data

Jul. 30, 2015 (AU) ................................ 2015903030

(51) Int. Cl.
*B60R 9/06* (2006.01)
*B60D 1/58* (2006.01)

(52) U.S. Cl.
CPC . *B60R 9/06* (2013.01); *B60D 1/58* (2013.01)

(58) Field of Classification Search
CPC .................................... B60R 9/06; B60D 1/58
See application file for complete search history.

(56) References Cited

U.S. PATENT DOCUMENTS

| 3,376,051 | A | * | 4/1968 | Bacher | B60D 1/065 |
| | | | | | 280/512 |
| 3,954,286 | A | | 5/1976 | Weber | 280/512 |
| 4,576,395 | A | | 3/1986 | Longoria | 280/511 |
| 4,901,896 | A | | 2/1990 | Speer | 224/42.07 |
| 5,549,230 | A | * | 8/1996 | Palmen | B60R 9/06 |
| | | | | | 224/511 |
| 5,573,263 | A | | 11/1996 | Denny et al. | 280/509 |
| 5,887,885 | A | | 3/1999 | Byers et al. | 280/512 |
| 6,698,995 | B1 | | 3/2004 | Bik et al. | 414/462 |
| 7,013,540 | B2 | | 3/2006 | Wang et al. | 24/709.4 |
| 7,735,850 | B1 | | 6/2010 | Curran | 280/511 |
| 2010/0117334 | A1 | | 5/2010 | Harlin | 280/507 |
| 2011/0241312 | A1 | | 10/2011 | Goettker | 280/513 |
| 2014/0015226 | A1 | | 1/2014 | MacKarvich | 280/509 |

FOREIGN PATENT DOCUMENTS

| AU | A-16343/97 | 10/1997 | ............... B60D 1/06 |
| AU | 2007100062 A4 | 3/2007 | ............... B60D 1/14 |
| GB | 1 109 313 | 4/1968 | ............... B60D 1/06 |
| GB | 1 487 736 | 10/1977 | ............... B60D 1/06 |
| WO | WO 2011/012130 | 2/2011 | ............... B60D 1/00 |

OTHER PUBLICATIONS

Patent Examination Report issued in corresponding Australian Patent Application No. 2016208258 dated Oct. 11, 2016.
Search Report issued in corresponding United Kingdom Patent Application No. GB1612557.7 dated Dec. 6, 2016.

* cited by examiner

*Primary Examiner* — Kevin Hurley
*Assistant Examiner* — Marlon A Arce
(74) *Attorney, Agent, or Firm* — Kusner & Jaffe

(57) ABSTRACT

A tow ball coupling and holder member suitable for towing a wheelie bin or transporting a bicycle. The tow ball coupling has a mechanism which is quick and simple to attach and remove without great physical effort or mechanical knowledge. The tow ball coupling includes a tow ball housing and a releasable tow ball catch arranged to allow the housing to admit the ball without manual operation of the catch.

6 Claims, 5 Drawing Sheets

TOW BALL COUPLING AND HOLDER MEMBER

FIELD OF INVENTION

The present invention relates to couplings attachable to tow balls on vehicles for transporting various items such as wheelie bins, bicycles and the like and to holders for such items.

BACKGROUND OF THE INVENTION

There are a number of items that are either too heavy or unwieldy lift by hand or, for other reasons, need to be transported by vehicle. It may not be desirable or possible to place such items inside a vehicle, such as an ordinary family car for example. Such items include wheelie bins, bicycles, light weight off road trailers such as those used for garden waste and the like.

Wheelie bins may be heavy and it may be difficult to wheel them to the road or other rubbish collection areas particularly where long or steep driveways need to be traversed or where residents needing to move the bins are elderly.

There have been a number of proposals for towing devices for wheelie bins by vehicles. For example, Australian innovation patent 2007100062 in the name of Amaze Promotions Pty Ltd describes a device consisting of an arm which has a hook member at one end that is placed through the handle of a wheelie bin and an aperture at the other end which attaches to a spike on the toe bar. When used with this device the wheelie bin must be loaded very close to the ground making it difficult to control as the bin may tip over.

Another proposal is that of Australian patent application 16343/97 in the name of Kaden which discloses a wheelie bin towbar hitch comprising two arms disposed at right angles with spring-loaded pins for engaging the wheelie bin and the toe ball. Again this appears to suffer from similar problems in that the bin would have to be lowered to the ground and may tip over. Further the operation of the spring-loaded pins may be difficult for elderly people with arthritic hands.

Other proposals such as U.S. Pat. No. 3,376,051 in the name of Bacher and U.S. Pat. No. 7,735,850 in the name of Curran relate to trailer hitches and ball mounts which require the operation of cumbersome levers or fiddly pins.

The above references to and descriptions of prior proposals or products are not intended to be, and are not to be construed as, statements or admissions of common general knowledge in the art.

SUMMARY OF THE INVENTION

In a first aspect the present invention provides a tow ball coupling suitable for use with a tow ball mounted on a vehicle, said coupling adapted to allow a vehicle to transport and/or tow at least one item, said coupling comprising: a) a suitable ball housing with an open end such that the coupling may be placed above the ball and lowered onto the ball, said housing being of a suitable size to restrict lateral movement of the ball within the housing; b) a releasable ball catch adjacent said open end of the ball housing which catch is movable between a ball retaining condition which retains the ball within the housing by limiting the vertical movement of the ball and a ball releasing condition; and c) a holder member for holding at least one item; d) wherein the housing and the catch are arranged such that relative movement of the coupling towards the ball displaces the catch to admit the ball to the housing without manual operation of the catch.

The present inventor set out to provide a tow ball coupling with a mechanism which is quick and simple to attach and remove without great physical effort or mechanical knowledge. Thus the tow ball coupling would be suitable for use by aged people or others who are not physically strong.

The term "items" refers to wheelie bins, bicycles and other domestic items which it may be desirable to transport on the exterior of a vehicle.

The term "a suitable ball housing" refers to an enclosure of suitable size and material to accommodate a tow ball of a vehicle. Preferably the ball housing is a cylinder made of aluminium, thermoplastics or other suitable material.

The term "ball catch" refers to a catch which is able to limit relative movement of the coupling and the ball by engaging the ball in cooperation with the ball housing. Preferably the ball catch will be in the form of a pawl. Even more preferably the pawl is biased for engagement with the tow ball. Still more preferably the pawl may be released by an associated manually operable lever. Yet more preferably the lever is biased such that the pawl remains in a ball retaining condition until the lever is operated.

The term "a ball retaining condition" refers to the ball being captured or confined within the housing.

The term "a ball releasing condition" refers to the housing being able to be removed from the ball (and vice versa).

The relative movement of the coupling towards the ball is facilitated by the weight of the coupling itself in combination with the holder member. The weight of the coupling and holder member exert downward force which causes the ball catch to admit the ball to the housing automatically with minimal manual input other than placing the coupling above the tow ball and releasing it.

The term "a holder member" refers to a member for holding or attaching the item to the coupling. This may be a conventional holder for holding a bicycle crossbar such as two plates with suitable concavities which can be screwed together or the novel holder developed by the present inventor and described below.

In another separate development the present invention provides a holder for supporting an elongated portion of an item such as a handle of a wheelie bin or a portion of a bicycle frame which item is to be carried or towed by a tow bar of a vehicle, said holder comprising: a suitable body mounted with a rotating closure member said body having an open condition and a closed condition wherein in said open condition said elongate portion of the item can be placed in said holder body and in a closed condition the elongate portion of the item is retained within the holder body wherein said holder is suitable for mounting on a vehicle via a tow ball coupling.

The term "suitable body" refers to the body being of an appropriate size and shape to be able to contain the elongate portion of the item.

Preferably the body is semicircular in cross section and defines a channel. Similarly, preferably the rotatable closure member is also semicircular in cross section and is slidably mounted on the body such that in a closed condition they form a cylindrical enclosure over the wheelie bin handle, for example. Depending on the item to be transported or towed, the long axis of the cylindrical enclosure can be parallel to the ground (for towing wheelie bin) or perpendicular to the ground for carrying a bicycle by its seat post.

In a particularly preferred aspect the invention provides a tow bracket which incorporates the tow ball coupling and holder separated by a riser.

BRIEF DESCRIPTION OF THE DRAWINGS

The invention will now be described with reference to the following non limiting illustrative drawings.

DETAILED DESCRIPTION OF THE INVENTION

Figure 1:
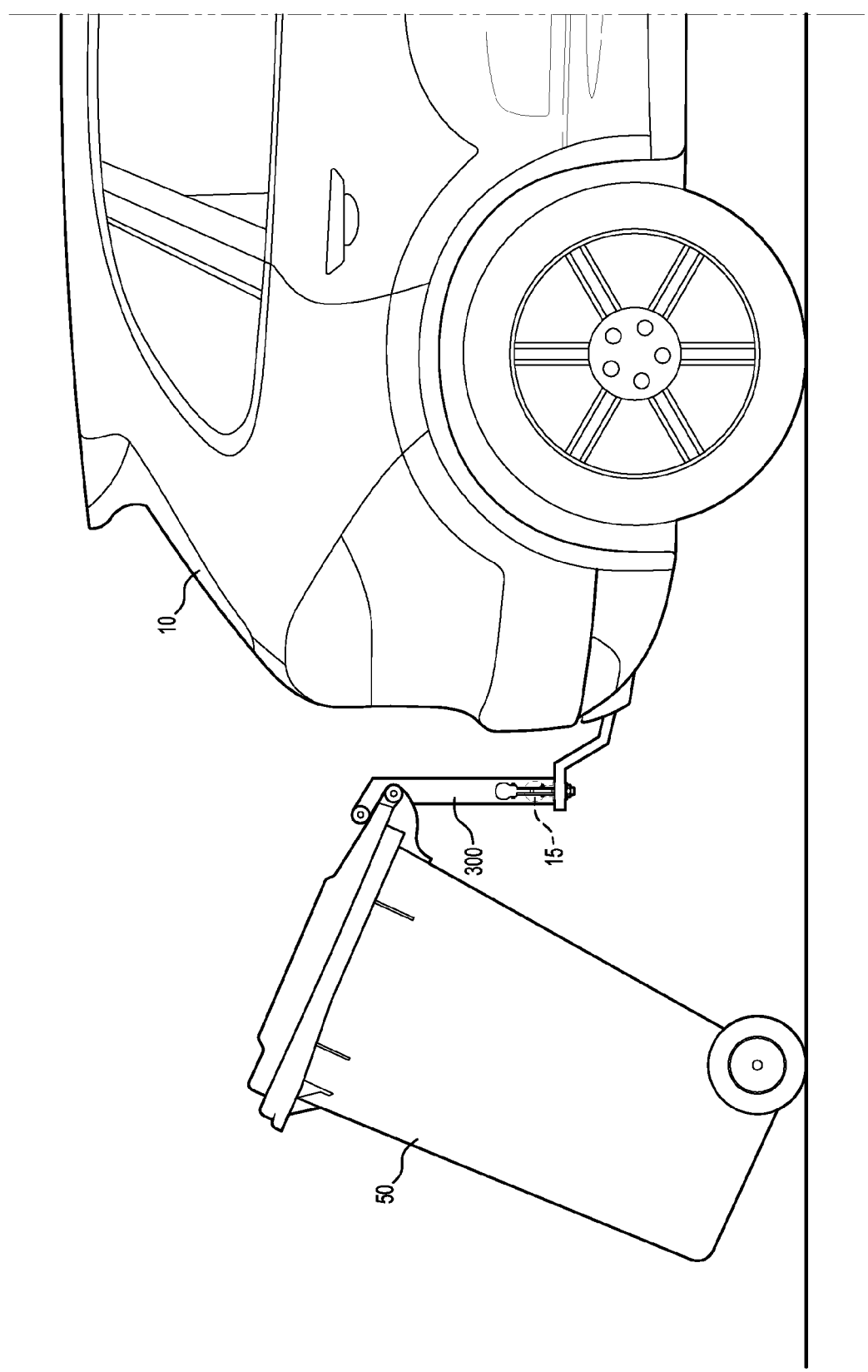
FIG. 1 is a schematic partial side view of a car with a tow bracket incorporating the tow ball coupling and holder towing a wheelie bin.
Figure 3A:
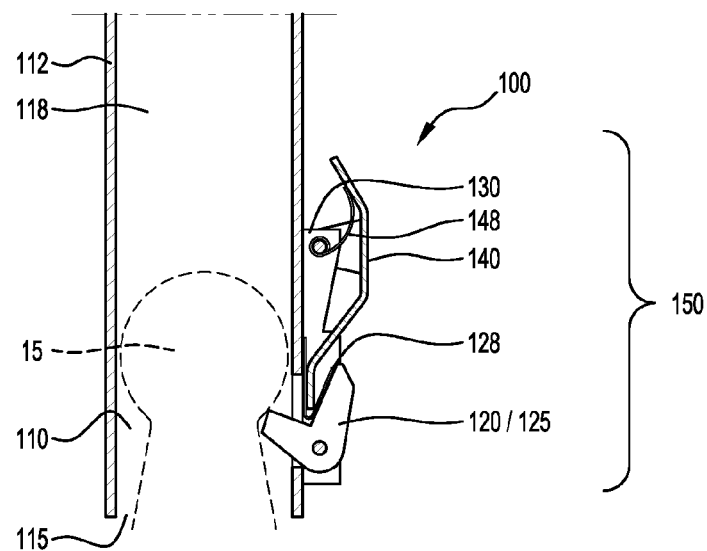
FIG. 3a is a side view of a longitudinal section of the ball housing with the tow ball inside.

FIG. 1 shows vehicle 10 towing a single wheelie bin 50 with tow bracket 300 mounted on tow ball 15. For reasons of clarity tow ball 15 is shown in FIG. 1 with a smaller diameter in relation to the housing which is more accurately represented in FIGS. 3a and 3b described below.

Figure 2:
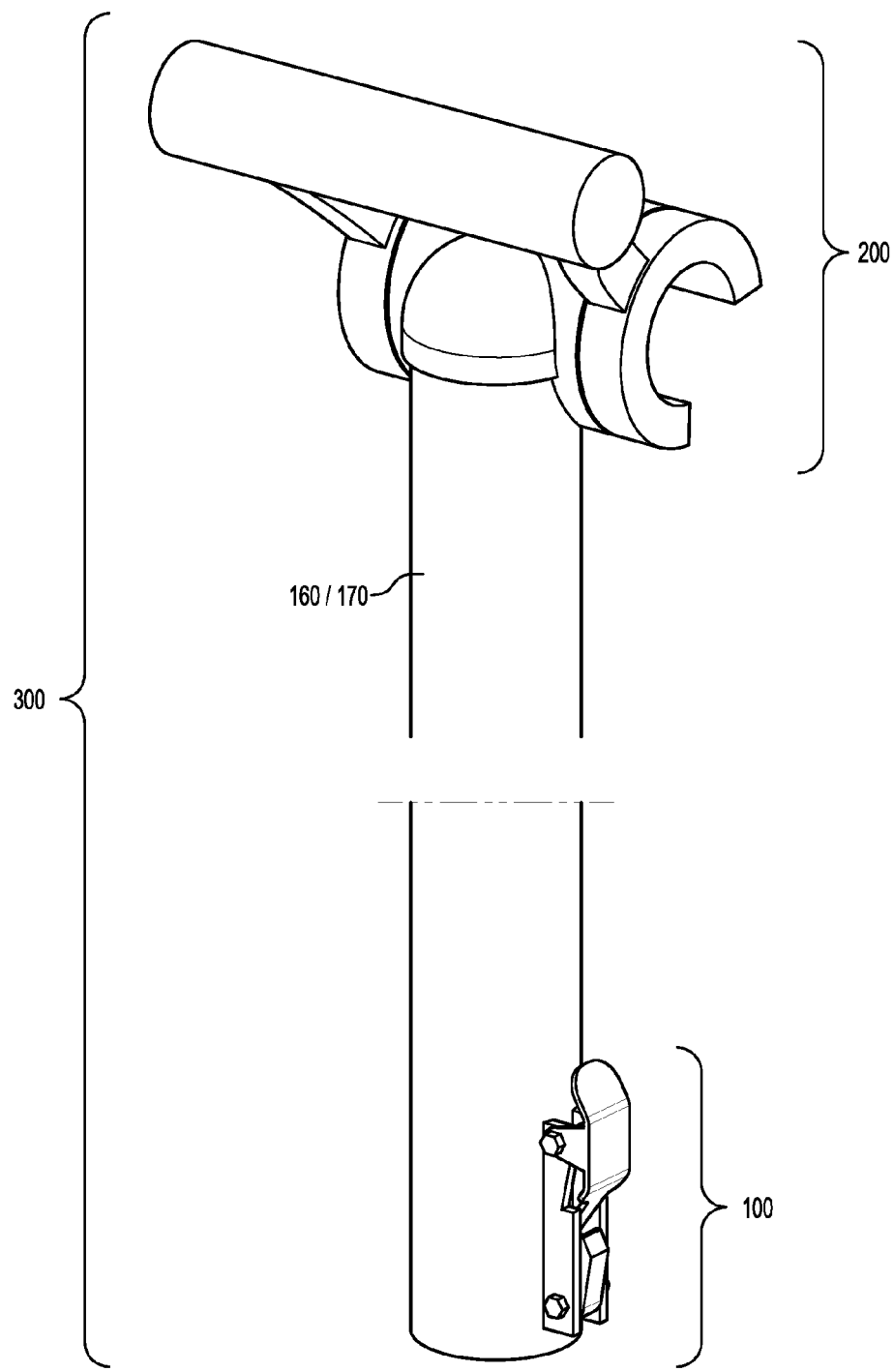
FIG. 2 is a rear perspective view of the tow bracket.

As seen in FIG. 2 tow bracket 300 incorporates both developments made by the present inventor: tow ball coupling 100 at one end and holder 200 at the other end separated by riser 160.

While in a preferred embodiment tow bracket 300 is provided as described it will be appreciated that tow ball coupling 100 and holder 200 may be provided independently and combined with other holders and tow ball couplings accordingly. In tow bracket 300 shown in FIG. 2 tow ball coupling 100 and riser 160 are provided by the same tubular member 170 which is capped by holder 200. It should be understood that different constructions/assembly configurations are also contemplated.

Where tow bracket 300 is produced to tow wheelie bin 50, riser 160 is of sufficient height so that it only needs to be tipped slightly to be attached to tow bracket 300. Riser 160 may be made of different heights/lengths to accommodate other items such as bicycles. While the drawings show only a single item being towed it is also contemplated that two or more risers 160, sufficiently spaced may be provided in combination with tow ball coupling 100.

Tow ball coupling 100 provided at foot of tow bracket 300 comprises ball housing 110 defined by cylindrical sidewall 112 with open end 115 leading into housing interior 118. Although a tube with a cylindrical sidewall is illustrated, it is possible that straight sidewalls either to form a square or triangle in cross section could be used provided the ball housing is of the appropriate size to snugly fit tow ball 15.

Self-locking latching assembly unit 150 adjacent open end 115 is made up of releasable ball catch 120, plates 130, lever 140, hairpin spring 128 and torsion spring 148.

Releasable ball catch 120 in the form of pawl 125 is pivotally mounted on a pair of parallel plates 130 fixed on side wall 112. Pawl 125 is made of aluminium and is basically a distorted "L" shape with main body 125a and tongue 125b. Tongue 125b extends into interior 118 via aperture 112a and is biased in a positive locking position by hairpin spring 128. Hairpin spring 128 is basically V-shaped in profile with a short arm 128a and a long arm 128b. Short arm 128a is mounted adjacent the vertex of pawl 125 and long arm 128b is freestanding. Arms 128a and 128b of hairpin spring are biased for compression with long arm 128b resting over part of aperture 112a and against adjacent sidewall 112 when pawl 125 is in a ball retaining condition.

Figure 3B:
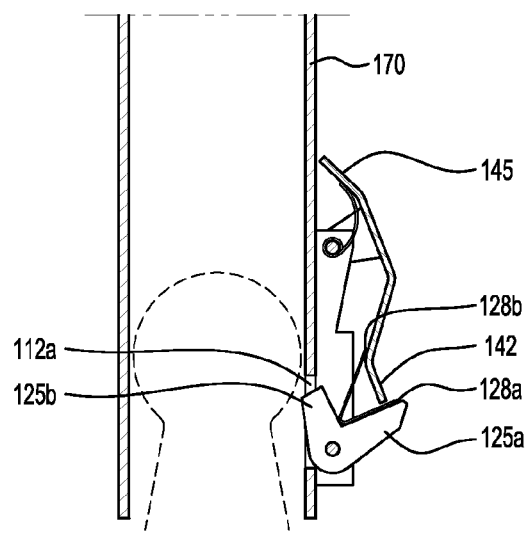
FIG. 3b is a side view of a longitudinal section of the ball housing with a tow ball entering the housing.
Figure 3C:
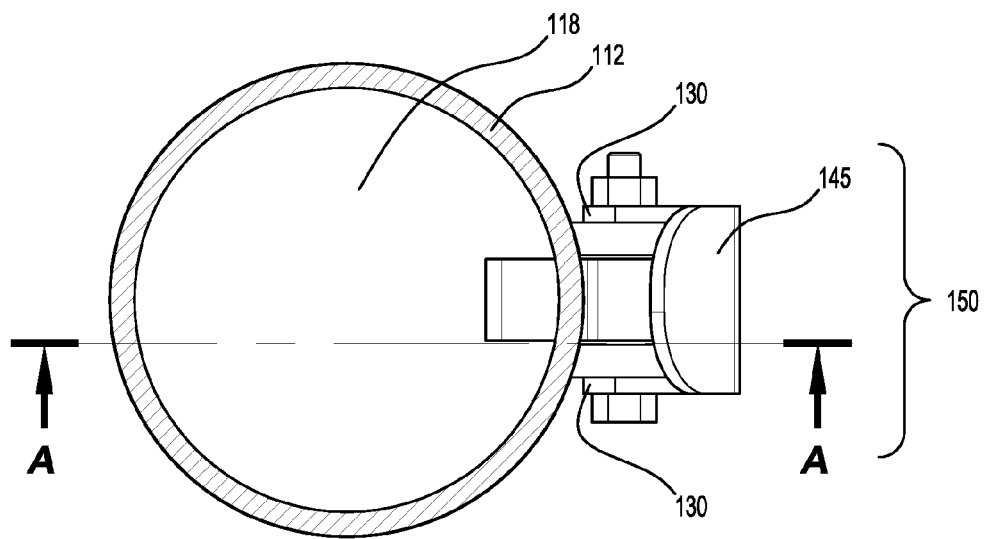
FIG. 3c is a top view schematic of the ball housing showing line A-A representing the section illustrated in FIGS. 3a and 3b.
Figure 4:
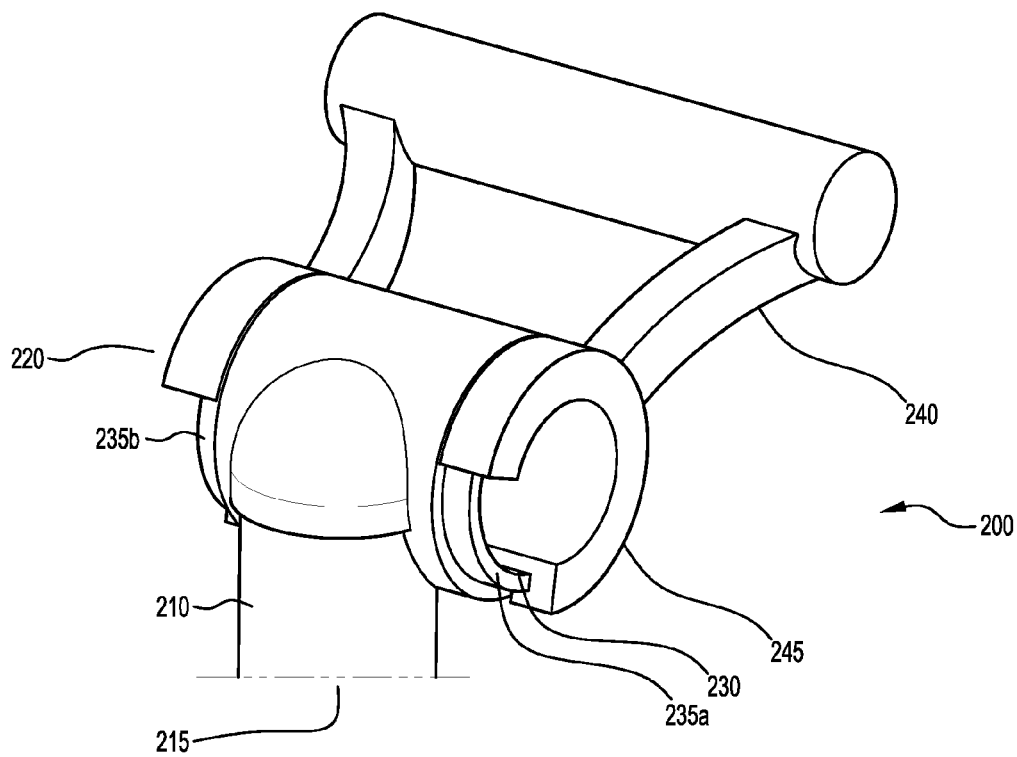
FIG. 4 is a rear 3-D perspective view of the holder in a closed condition.

Lever 140 with thumb catch 145 at one end and arm 142 at the other end are an integral unit pivotally mounted above pawl 125 on plates 130. Lever 140 is bolted to plates 130 together with associated torsion spring 148 to bias it in position. Lever arm 142 extends between arms 128a and 128b of hairpin spring 128. Lever arm 142 cooperates with pawl 125 in its ball retaining condition by sitting alongside long arm 128b of hairpin spring 128. When pivoted into the ball release position as seen in FIG. 3b lever arm 142 pushes on short arm 128a. Long arm 128b also cooperates by pressing on lever arm 142 to pivot tongue 125b out of housing interior 118 thus allowing pawl 125 to disengage with tow ball 15. This enables coupling 100 to be lifted off.

It will be noted that in the ball retaining condition tongue 125b just needs to engage tow ball 15 anywhere below the centreline (between the widest part of the tow ball and including its neck).

Pawl 125 is mounted so that it is pushed by tow ball 15 and pivots out of the way to allow tow ball 15 to pass into ball housing 110 via aperture 112a. The weight of the coupling and any riser or other attachment allows the coupling to be simply dropped onto ball 15 with no precise guidance needed. Pawl 125 is automatically pivoted out of housing interior 118 when coupling 100 is dropped onto ball 15. In addition, because of its bias pawl 125 immediately assumes a ball retaining condition which locks ball 15 in place.

Lever 140 is activated to achieve a ball releasing condition. Lever 140 operates to release pawl 125 by pressing thumb catch 145 towards tubular member 170 (described below) causing pawl 125 to pivot and withdrawing tongue 125b from ball housing 110. The automatic locking and the requirement for positive manual operation of the lever to release the coupling is an important feature of the invention.

Riser 160 in the form of tubular member 170 is made out of suitably strong aluminium, the lower end of which forms ball housing 110

Holder 200 is made of injection moulded thermoplastic material and comprises capped sleeve 210 and holder body 220.

Capped sleeve 210 has open end 215 and is of suitable size and shape for fitting to riser 160 and secured by gluing or other suitable fixing means.

Holder body 220 is cylinder-like in a closed condition and disposed at right angles to sleeve 210. Holder body 220 comprises mouth 230 moulded in one piece and rotatable closure means 240 in the form of sliding gate 245. Sliding gate 245 is moulded in two pieces.

Figure 5A:
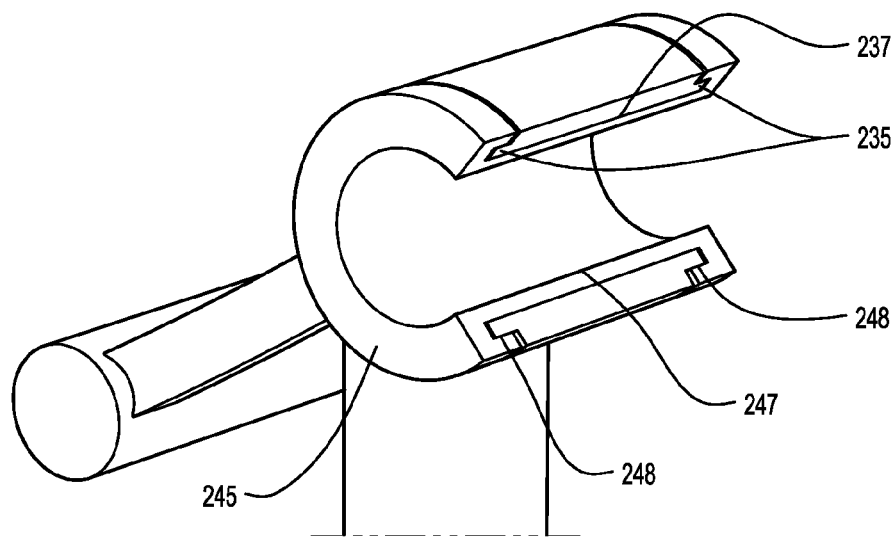
FIG. 5a is a front 3-D perspective view of the holder in an open condition.
Figure 5B:
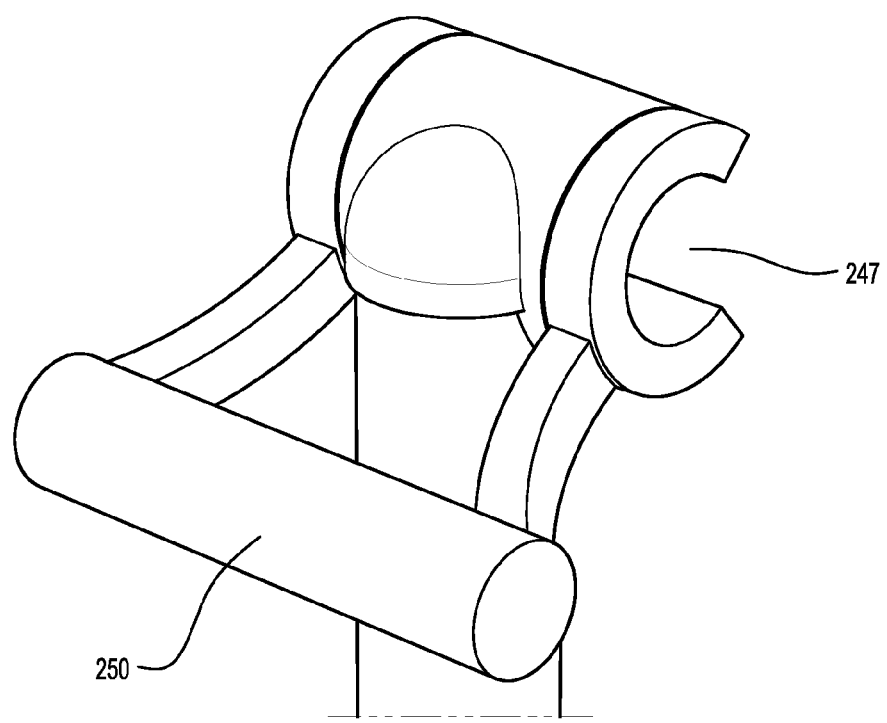
FIG. 5b is a rear 3-D perspective view of the holder in an open condition.

Mouth 230 is semicircular in cross section and comprises a cavity or channel with an interval or opening defined by slot 237 (see FIG. 5a). Mouth 230 also comprises stepped ends 235. Stepped ends 235 are for mounting sliding gate 245.

Sliding gate 245 is similar in cross section to mouth 230 and is cylinder-like in shape with opening 247 along its length and annular recesses 248 at each end. Sliding gate 245 has handle 250 located opposite opening 247.

Sliding gate 245 is mounted onto mouth 230 by stepped ends 235 which are dovetailed into annular recesses 248. This dovetailing arrangement allows sliding gate 245 to be rotated in mouth 230. When handle 250 is rotated downward towards tubular member 170, holder 200 is in an open condition. In this condition a wheelie bin handle or other elongate member can be placed into sliding gate 245 and handle 250 can be rotated back again to put holder 200 in a closed position. Optionally a locking means (not shown) may be included to retain holder 200 in a closed position.

REFERENCE NUMBER LIST

| Reference Numeral | Feature/part |
| --- | --- |
| 10 | Vehicle |
| 15 | Tow ball |
| 50 | Wheelie bin |
| 100 | Tow ball coupling |
| 110 | ball housing |
| 112 | Sidewall |
| 112a | Aperture in sidewall |
| 115 | Open end in ball housing |
| 118 | Housing interior |
| 120 | Releasable ball catch |
| 125 | Pawl |
| 125a | Main body of pawl |
| 125b | tongue on pawl |
| 128 | Hairpin spring |
| 128a | Short arm of hairpin spring |
| 128b | Long arm of hairpin spring |
| 130 | Parallel mounting plates |
| 140 | Lever |
| 142 | Arm of Lever |
| 145 | Thumb catch on Lever |
| 148 | Torsion spring |
| 150 | Self-locking Latching assembly unit |
| 160 | Riser |
| 170 | Tubular member |
| 200 | Holder |
| 210 | Capped sleeve |
| 220 | Holder body |
| 230 | Mouth of holder body |
| 235a and b | Stepped ends of mouth |
| 237 | Slot on mouth |
| 240 | Rotatable closure |
| 245 | Sliding gate |
| 247 | Opening on sliding gate |
| 248 | Annular recesses on sliding gate |
| 250 | Handle |
| 300 | Tow bracket |

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

Throughout this specification and the claims that follow, unless the context requires otherwise the words "comprise," "comprises," "comprising" will be understood to mean the inclusion of the stated integer, step or group of integers or steps but not the exclusion of any of other integer, step or group of integers or steps.

Having described the invention, the following is claimed:

1. A tow ball coupling for use with a tow ball mounted on a vehicle, said coupling adapted to allow a vehicle to transport and/or tow at least one item, said coupling comprising:

a) a ball housing having an open end such that the coupling may be placed above the tow ball and lowered onto the tow ball, said housing being of a size to restrict lateral movement of the tow ball within the housing;

b) a releasable ball catch adjacent said open end of the housing, said catch movable between (i) a ball retaining condition which retains the tow ball within the housing by limiting vertical movement of the tow ball and (ii) a ball releasing condition; and c) a holder member for holding said at least one item;

d) wherein said ball housing is formed at a first, lower end of a riser and said holder member is located at a second, upper end of said riser, said riser being vertically positioned when said tow ball is admitted to said ball housing; and e) wherein the housing and the catch are arranged such that relative movement of the coupling towards the tow ball displaces the catch to admit the tow ball to the housing without manual operation of the catch.

2. The coupling of claim 1, wherein the catch is a pawl pivotally mounted on said housing and biased for engagement with the tow ball.

3. The coupling of claim 2, wherein a lever operates on the pawl to bring about the ball releasing condition.

4. The coupling of claim 3, wherein the lever is biased such that the pawl remains in the ball retaining condition until operated.

5. The coupling of claim 4, wherein the housing has an aperture which allows part of the pawl to move into and out of the housing.

6. A tow ball coupling and holder combination suitable for use with a tow ball mounted on a vehicle, said combination adapted to allow a vehicle to transport and/or tow at least one item having an elongated portion, said coupling comprising:

a) a ball housing having an open end such that the coupling may be placed above the tow ball and lowered onto the tow ball, said housing being of a size to restrict lateral movement of the tow ball within the housing;

b) a releasable ball catch adjacent said open end of the housing, said catch movable between (i) a ball retaining condition which retains the tow ball within the housing by limiting vertical movement of the tow ball and (ii) a ball releasing condition;

c) wherein the housing and the catch are arranged such that relative movement of the coupling towards the tow ball displaces the catch to admit the tow ball to the housing without manual operation of the catch;

d) a holder member for holding said at least one item;

e) wherein said holder member comprises a body mounted with a rotatable closure member, said body having an open condition and a closed condition, wherein in said open condition said elongated portion of the item can be placed in said body and in said closed condition the elongated portion of the item is retained within said body; and f) wherein said body of said holder member and said rotatable closure member are semicircular in cross-section and in use said body of said holder member and said rotatable closure member slide with respect to each other to form a cylinder.

* * * * *